(12) United States Patent
Ling

(10) Patent No.: US 8,884,551 B2
(45) Date of Patent: Nov. 11, 2014

(54) FLYBACK SWITCHING REGULATOR WITH PRIMARY SIDE REGULATION

(71) Applicant: Texas Instruments Incorporated, Dallas, TX (US)

(72) Inventor: Hok-Sun Ling, New Territories (HK)

(73) Assignee: Texas Instruments Incorporated, Dallas, TX (US)

( * ) Notice: Subject to any disclaimer, the term of this patent is extended or adjusted under 35 U.S.C. 154(b) by 109 days.

(21) Appl. No.: 13/741,069

(22) Filed: Jan. 14, 2013

(65) Prior Publication Data

US 2013/0181635 A1    Jul. 18, 2013

Related U.S. Application Data

(60) Provisional application No. 61/586,616, filed on Jan. 13, 2012.

(51) Int. Cl.
*G05F 1/00* (2006.01)
*H02M 3/335* (2006.01)

(52) U.S. Cl.
USPC ...................... 315/297; 363/21.12; 363/21.03

(58) Field of Classification Search
USPC ............... 315/291, 294, 297, 307; 363/21.12, 363/21.03
See application file for complete search history.

(56) References Cited

U.S. PATENT DOCUMENTS

| | | | |
|---|---|---|---|
| 7,499,295 B2* | 3/2009 | Indika de Silva et al. | . 363/21.18 |
| 8,148,919 B2* | 4/2012 | Liu et al. | 315/307 |
| 2007/0274107 A1* | 11/2007 | Garner et al. | 363/21.12 |
| 2010/0246216 A1* | 9/2010 | Coulson et al. | 363/21.12 |
| 2010/0296318 A1* | 11/2010 | Teo | 363/21.03 |
| 2010/0308733 A1* | 12/2010 | Shao | 315/119 |
| 2011/0080111 A1* | 4/2011 | Nuhfer et al. | 315/291 |
| 2011/0157923 A1* | 6/2011 | Ren et al. | 363/21.12 |
| 2011/0227506 A1* | 9/2011 | Ren et al. | 315/307 |
| 2012/0032613 A1* | 2/2012 | Liu et al. | 315/297 |
| 2012/0092902 A1* | 4/2012 | Gaknoki et al. | 363/21.12 |
| 2012/0153866 A1* | 6/2012 | Liu | 315/294 |
| 2012/0187869 A1* | 7/2012 | Angelin et al. | 315/307 |

* cited by examiner

*Primary Examiner* — Thienvu Tran
(74) *Attorney, Agent, or Firm* — Andrew Viger; Frederick J. Telecky, Jr.

(57) ABSTRACT

The disclosed switching regulator, including a controller for a switching regulator, is adaptable to supplying, or controlling the supply of, regulated current to a load that is isolated from a source of input power by a flyback transformer, and includes: (a) detecting, after transistor $SW_{OFF}$, a zero crossing ZCD corresponding to a primary side switching node voltage $V_{SW}$ decreasing to the input voltage Vin, which occurs after a secondary current $I_S$ is substantially zero and before the next $SW_{ON}$; (c) establishing a time-integral window T-I_W with a leading edge corresponding to $SW_{OFF}$ and a trailing edge corresponding to ZCD; and (d) modulating at least the time $SW_{OFF}$ relative to $SW_{ON}$ based on the primary peak current $I_{PP}$ at $SW_{OFF}$ and the time-integral window, such that a regulated load current is supplied to the load.

9 Claims, 5 Drawing Sheets

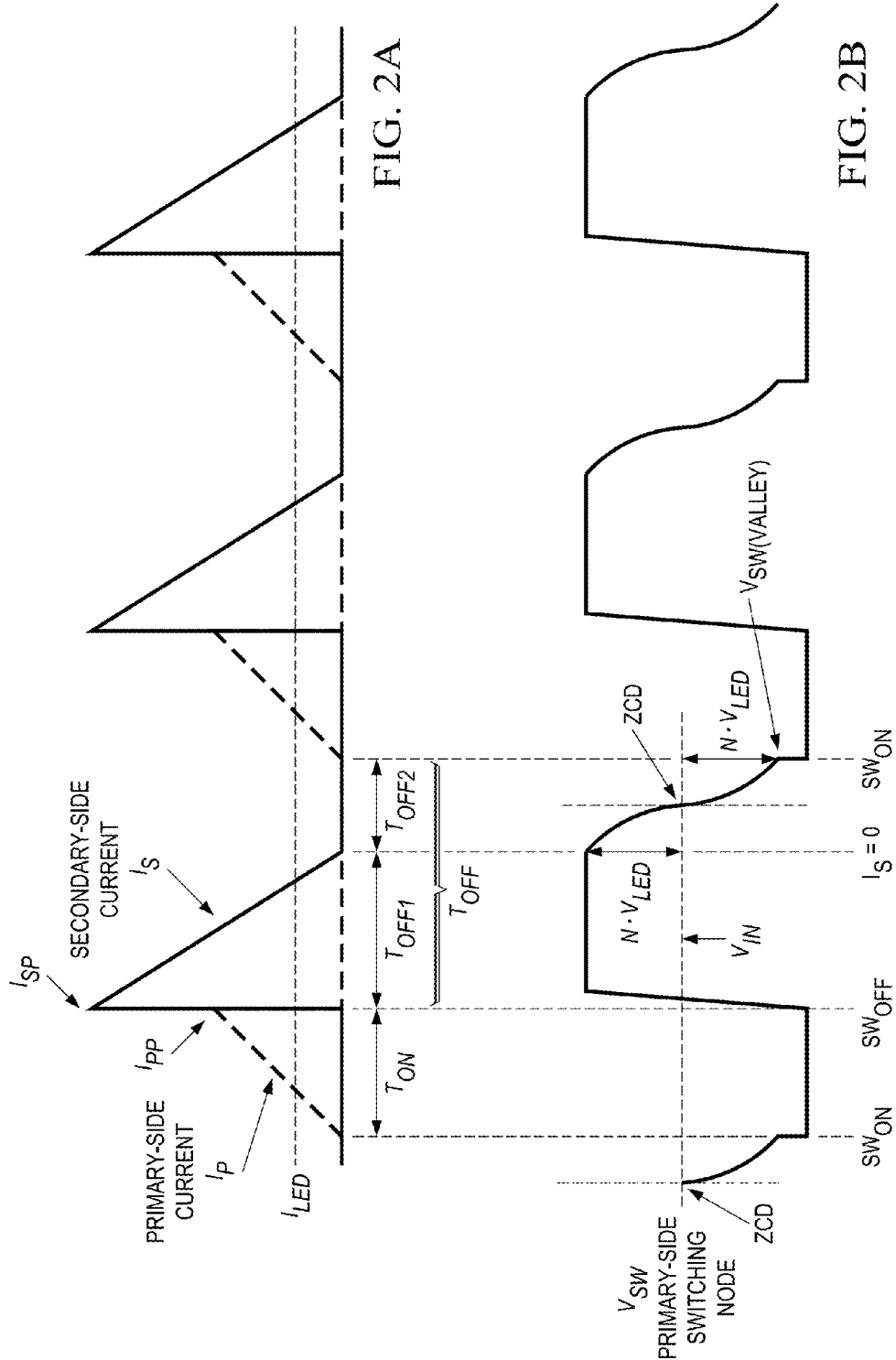

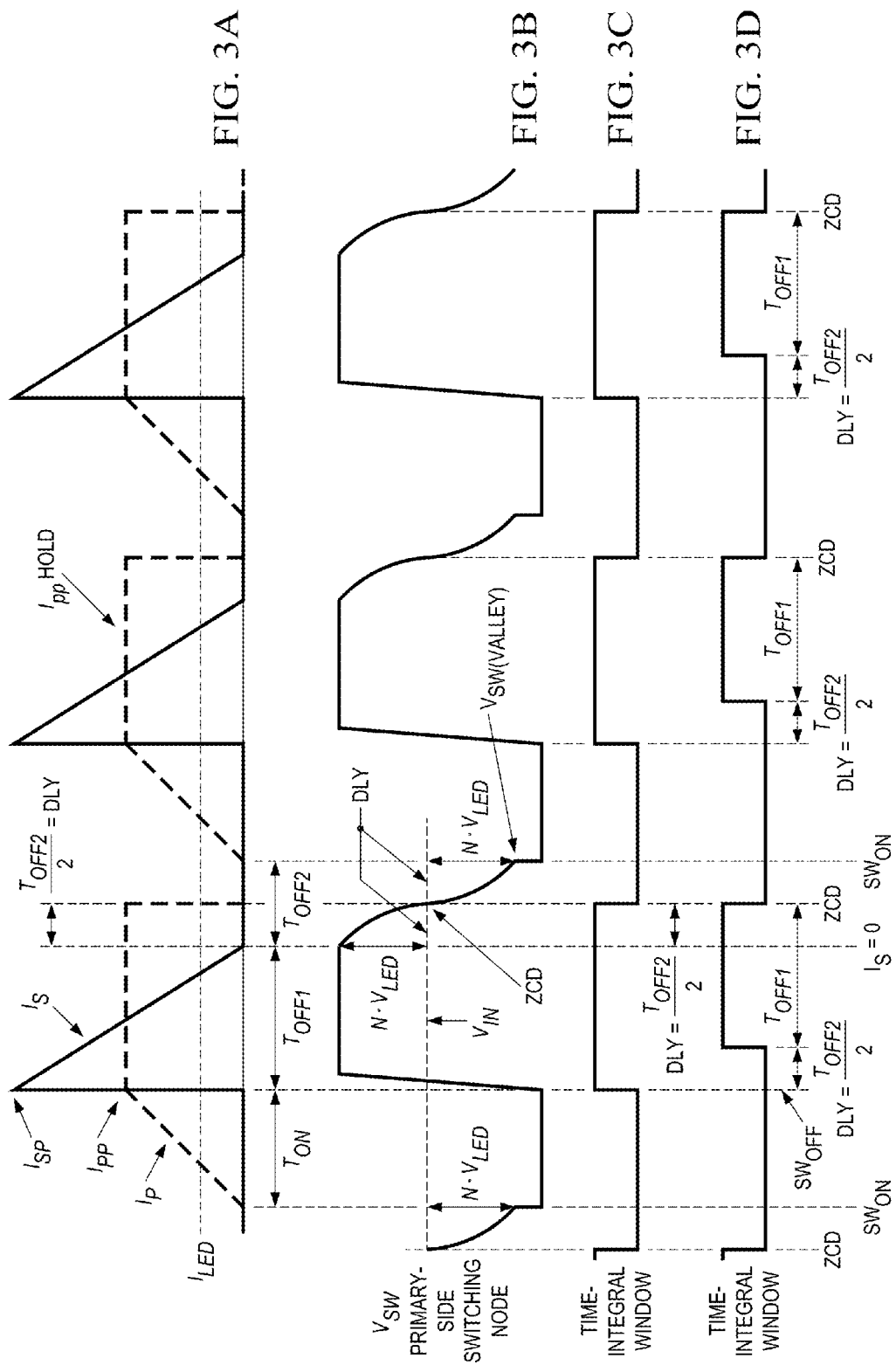

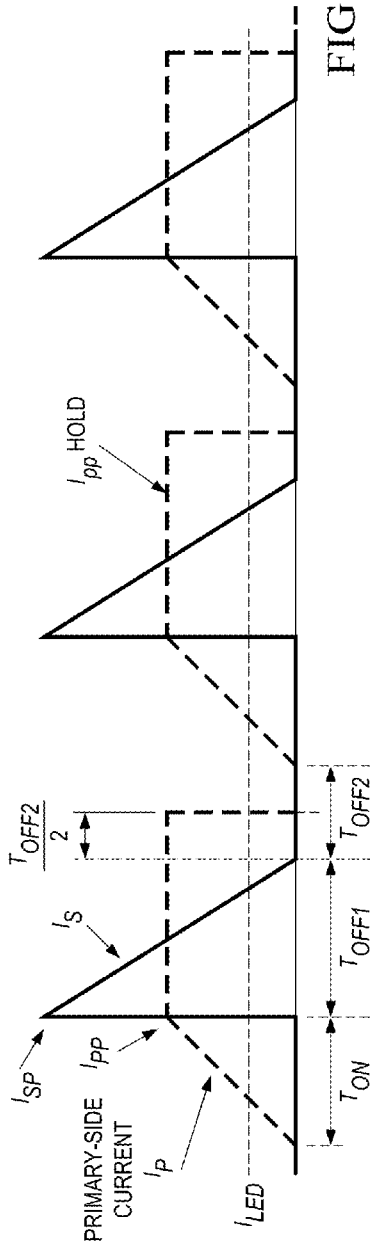
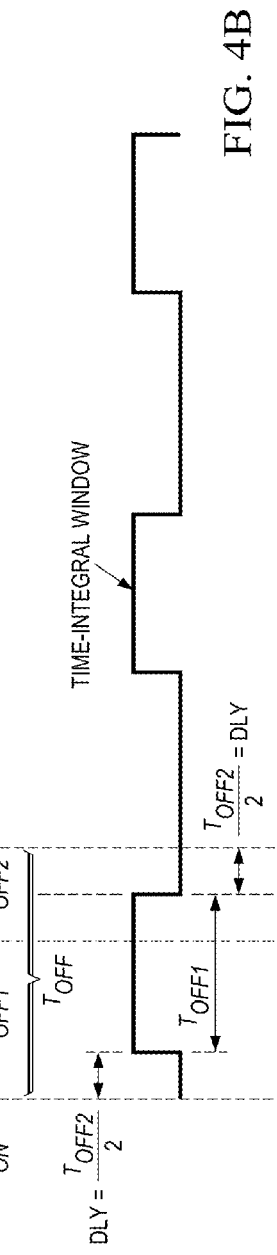
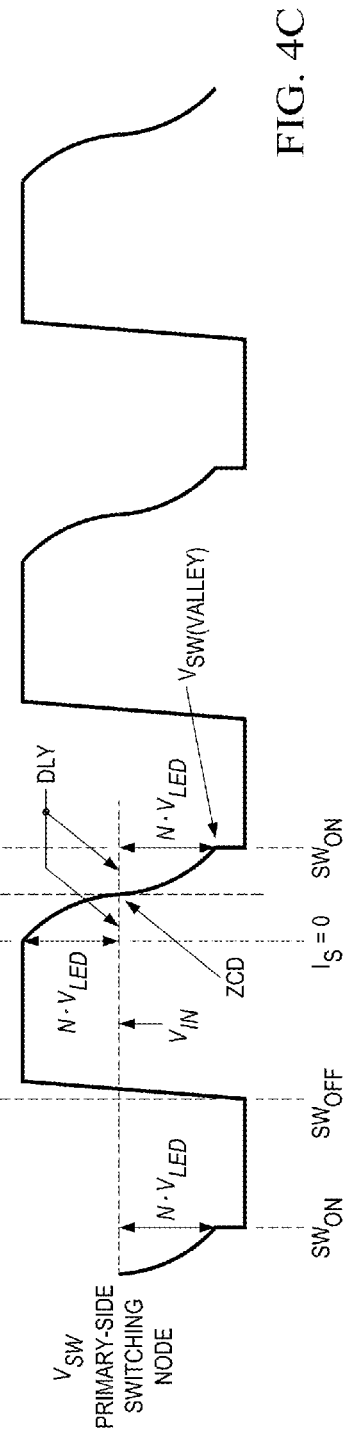
FIG. 4A
FIG. 4B
FIG. 4C

US 8,884,551 B2

FLYBACK SWITCHING REGULATOR WITH PRIMARY SIDE REGULATION

CROSS-REFERENCES TO RELATED APPLICATIONS

Priority is hereby claimed under U.S.C. §119(e) to U.S. Provisional Application 61/586,616, filed Jan. 13, 2012

BACKGROUND

1. Technical Field

This Specification relates generally to switching regulators (switched mode power supplies) for isolated-load applications, such as may be used as a switching regulator for an isolated LED (string) load.

2. Related Art

One application for switching regulators (switched mode power supplies/converters or SNAPS) is to provide a regulated load current for an LED string. Such LED switching regulators may be used in DC/DC converter applications, but are commonly used in off-line AC/DC applications (i.e., where the power input to the switching regulator is from an AC power line). In such off-line AC/DC applications, and some DC/DC applications, the load is required to be isolated from the AC line or other source of input power.

For off-line isolated applications, an LED switching regulator is commonly based on a flyback converter/transformer with primary side switching and control. The regulation loop includes a primary side controller that provides gate drive for the switching transistor, converting AC voltage/current from the AC power line into a regulated, substantially constant secondary side current supplied to the LED load.

Implementing a switching regulation loop requires that the primary side controller directly or indirectly receive some indication or representation of secondary side current. A direct approach is to use direct secondary side current sensing with secondary-to-primary side feedback across the isolation transformer to the primary side controller, such as by means of an opto-coupler.

To eliminate the need for an opto-coupler or other means of secondary side sensing/feedback, an alternative approach is to use information detected/sensed on the primary side as a representation of secondary side current. That is, the primary side controller receive input(s) from detecting/sensing primary side operational parameters, which are used to control transistor switching, establishing an primary side regulation loop to control primary side power conversion and provide regulated, substantially constant secondary side current through the LED load.

While this Background information is presented in the context of a switching regulator for LED applications, this Specification is not limited to such applications, but is more generally directed to switching regulators (SMPS converter/controller) applications in which an isolated load requires a regulated supply current.

BRIEF SUMMARY

This Specification discloses and claims apparatus and methods for supplying regulated current to an isolated load using a primary side regulation loop that obviates direct secondary-side current sensing and feedback. The Detailed Description and Figures set forth example embodiments that illustrate various aspects and technical features of the invention defined by the Claims.

Aspects and technical features of the claimed invention include supplying, or controlling the supply of, regulated current to a load that is isolated from a source of input power by a flyback transformer, including: (a) controlling a switching transistor to switch on at a time $SW_{ON}$ and off at a time $SW_{OFF}$, such that a primary side current $I_P$ increases from substantially zero at $SW_{ON}$ to a primary peak current $I_{PP}$ at $SW_{OFF}$, inducing a secondary side current $I_S$ that decreases from a peak current $I_{SP}$ at $SW_{OFF}$ to substantially zero before the next $SW_{ON}$, in accordance with discontinuous conduction mode operation; (b) detecting, after $SW_{OFF}$, a zero crossing ZCD corresponding to the primary side switching node voltage V decreasing to the input voltage Vin, which occurs after the secondary current $I_S$ is substantially zero and before the next $SW_{ON}$; (c) establishing a time-integral window T-I_W with a leading edge corresponding to $SW_{OFF}$ and a trailing edge corresponding to ZCD; and (d) modulating at least the time $SW_{OFF}$ relative to $SW_{ON}$ based on the primary peak current $I_{PP}$ at $SW_{OFF}$ and the time-integral window, such that a regulated load current is supplied to the load.

In other aspects of the claimed invention, (a) the flyback transformer is characterized by quasi-resonance such that, at a time after $SW_{OFF}$, $V_{SW}$ decreases by quasi-resonant damping through a zero crossing ZCD to a valley voltage $V_{SW}$ (Valley), where ZCD occurs after a time delay DLY corresponding to a time for $V_{SW}$ to decrease by resonant damping from a voltage associated $SW_{OFF}$ to ZCD, and (b) DLY is used (i) to adjust the leading edge of the time-integral window T-I_W such that T-I_W corresponds to a duration $T_{OFF1}$ between $SW_{OFF}$ and the time $I_S$ decreases to substantially zero, and/or (ii) to initiate $SW_{ON}$ at a time corresponding to DLY after the occurrence of ZCD, corresponding to a duration $T_{OFF2}$ between the time $I_S$ decreases to substantially zero and the time $V_{SW}$ decreases to $V_{SW}$(Valley), thereby implementing valley switching.

Other aspects and technical features of the invention disclosed and claimed in this Specification will be apparent to those skilled in the art from the Description, Figures and Claims.

BRIEF DESCRIPTION OF THE DRAWINGS

FIGS. 2A and 2B illustrate, for an example embodiment of a flyback transformer operating in switched discontinuous conduction mode according to this Specification, example waveforms for (2A) switched primary and secondary side currents $I_P$ and $I_S$, and (2B) a voltage $V_{SW}$ at a primary side switching node with quasi-resonant damping after the secondary current $I_S$ decreases to zero.

FIGS. 3A and 3B illustrate, for the example embodiment of a flyback transformer operating in discontinuous conduction mode according to this Specification, example waveforms for (3A) switched primary and secondary side currents $I_P$ and $I_S$, with primary and secondary peak currents $I_{PP}$ and $I_{SP}$, and (3B) the voltage $V_{SW}$ at a primary side switching node with quasi-resonant damping, including illustrating (a) transistor switching cycles $T_{ON}$ and $T_{OFF}$ ($T_{OFF1}+T_{OFF2}$), and related primary and secondary side currents $I_P/I_{PP}$ and $I_S/I_{SP}$, and (b) primary side switching node voltage $V_{SW}$ with quasi-resonant damping, resulting in (c) a zero crossing ZCD associated with $V_{SW}$ decreasing by quasi-resonant damping to $V_{IN}$ after a resonant time delay DLY in accordance with aspects of the claimed invention as disclosed in this Specification.

FIGS. 3C and 3D illustrate, in conjunction with the example waveforms in FIGS. 3A and 3B, example embodiments of the primary side regulation methodology disclosed in this Specification, as represented by example time-integral windows used in modulating primary side switching, where FIGS. 3C and 3D respectively illustrate example embodiments in which primary side regulation is based on a time-integral window respectively not adjusted and adjusted for the resonant time delay DLY associated with ZCD for the primary side $V_{SW}$.

FIGS. 4A, 4B and 4C illustrate an example embodiment of the primary side regulation methodology in which primary side sensing of ZCD, and the relationship to DLY, is used for both adjusting the time-integral window based on the resonant time delay DLY associated with ZCD for the primary side $V_{SW}$, and effecting valley switching by controlling the initiation of a switch on cycle $SW_{ON}$ in relation to the resonant damping of $V_{SW}$ (as represented by ZCD and DLY), according to aspects of the claimed invention as disclosed in this Specification, where FIGS. 4A and 4C respectively illustrate example waveforms for primary and secondary side currents $I_P$ and $I_S$, and primary side switching node voltage $V_{SW}$ with valley switching at $V_{SW}$(Valley), and FIG. 4B illustrates an example waveform for a time-integral window adjusted for the resonant time delay DLY.

DETAILED DESCRIPTION

Figure 1A:
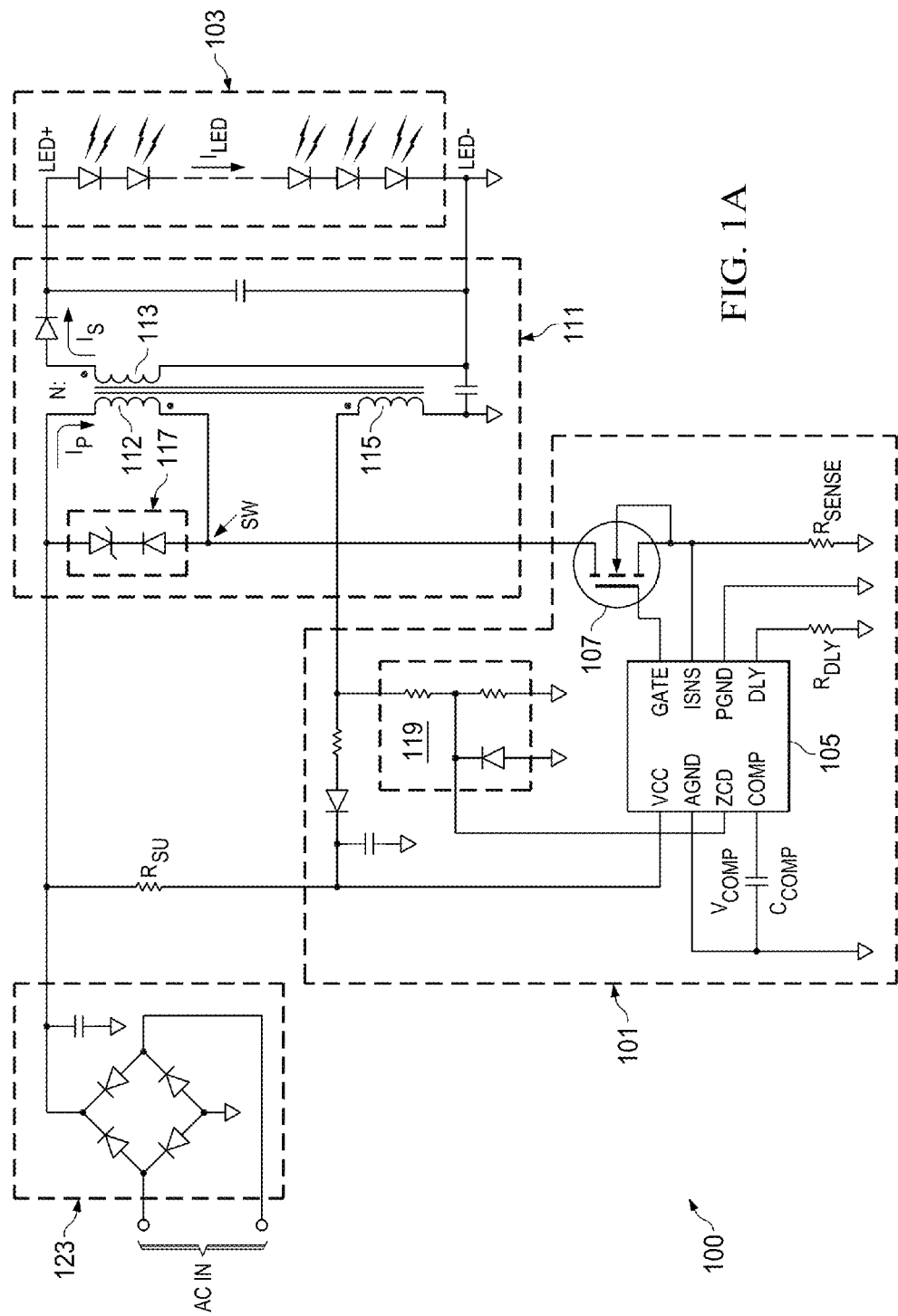
FIG. 1A illustrates an example embodiment of an off-line, flyback switching regulator for supplying regulated current to an isolated LED string, including primary side regulation according to aspects of the claimed invention disclosed in this Specification.

This Detailed Description, together with the Figures, discloses example embodiments, and example applications, that illustrate various aspects and technical features of the invention claimed in this Specification. However, these example embodiments and example applications, are illustrative only and should not be construed to limit the scope of the invention disclosed in this Specification which is defined by the Claims—other embodiments and applications will be apparent to those skilled in the art from the Description, Figures and Claims. Known circuits, functions and operations are not described in detail to avoid unnecessarily obscuring the principles and features of the claimed invention.

In brief overview, this Specification discloses and claims apparatus and methods for supplying, or controlling the supply of, regulated current to an isolated load using a primary side regulation loop that obviates direct secondary-side current sensing and feedback. An example application described in this Specification is an off-line AC/DC switching regulator configured to supply a regulated, substantially constant current to an isolated LED (string) load.

In an example embodiment, a circuit controls a switching regulator including a flyback transformer and a switching transistor coupled to a primary side winding at a switching node SW, which is configured to supply regulated current to a load that is isolated from a source of input power by the flyback transformer. The circuit includes: (a) controller circuitry, zero crossing detect circuitry and time-integral circuitry. The controller circuitry is configured to switch the transistor on at a time $SW_{ON}$ and off at a time $SW_{OFF}$, such that a primary current $I_P$ through the primary side winding increases from substantially zero at $SW_{ON}$ to a primary peak current $I_{PP}$ at $SW_{OFF}$, thereby inducing in the secondary side winding a secondary current $I_S$ that decreases from a peak current $I_{SP}$ at $SW_{OFF}$ to substantially zero before the transistor is switched on at a next $SW_{ON}$, in accordance with discontinuous conduction mode operation. The zero crossing detect circuitry is configured to detect, after $SW_{OFF}$, a zero crossing ZCD corresponding to a voltage $V_{SW}$ at a primary side switching node SW decreasing in magnitude to an input voltage $V_{IN}$, which occurs after the secondary current $I_S$ is substantially zero and before the transistor is switched on at the next $SW_{ON}$. The time-integral circuitry is configured to establish a time-integral window T-I_W with a leading edge corresponding to $SW_{OFF}$ and a trailing edge corresponding to ZCD. The controller circuitry operable to modulate at least the time $SW_{OFF}$ relative to $SW_{ON}$ based on the primary peak current IPP at $SW_{OFF}$ and the time-integral window T-I_W, such that a regulated load current is supplied to the load.

In another example embodiment, the flyback transformer is characterized by quasi-resonance associated with the transformer inductance and node capacitance at the primary-side switching node SW, such that $V_{SW}$ decreases by quasi-resonant damping through a zero crossing ZCD to at least a first valley voltage $V_{SW}$(Valley). The time-integral circuitry includes delay circuitry configured to determine, after the time $SW_{OFF}$, a time delay DLY corresponding to a time for $V_{SW}$ to decrease by resonant damping from a voltage associated $SW_{OFF}$ to ZCD. The time delay DLY is used by at least one of: (a) the time-integral circuitry to adjust the leading edge of the time-integral window T-I_W by DLY such that T-I_W corresponds to a duration $T_{OFF1}$ between $SW_{OFF}$ and the time $I_S$ decreases to substantially zero, and (b) the controller circuitry to initiate $SW_{ON}$ at a time corresponding to DLY after the occurrence of ZCD, corresponding to a duration $T_{OFF2}$ between the time $I_S$ decreases to substantially zero and the time $V_{SW}$ decreases to $V_{SW}$(Valley).

FIG. 1A illustrates an example embodiment of an off-line, flyback switching regulator for supplying regulated current to an isolated LED (string) load, including primary side regulation according to aspects of the claimed invention disclosed in this Specification.

An LED light system 100 includes a switching regulator 101 that controls power conversion, supplying regulated current to an LED load 103. For off-line operation, a flyback transformer 111 isolates the LED load from the AC line. A full bridge rectifier 123 supplies rectified DC.

Switching regulator 101 includes a controller 105 providing gate drive to a switching transistor 107 (such as a power MOSFET). Flyback transformer 111 includes primary and secondary side windings 112 and 113, and an auxiliary winding 115. A diode snubber 117 is coupled across the primary winding. Switching transistor 107 is drain coupled to flyback transformer 111 at a primary side switching node SW.

Flyback transformer 111 operates in discontinuous conduction mode, where discontinuous conduction mode is used to mean that the secondary current $I_S$ in the secondary-side winding decreases to zero ($I_S$=0) before the next switching cycle starts with $SW_{ON}$. The flyback transformer is quasi-resonant as a result of primary inductance and node capacitance at the switching node SW, such that during switching operation of the flyback transformer as described below, the voltage at the primary side switching node $V_{SW}$ rings down under quasi-resonant damping.

Switching regulator 101 and flyback transformer 111 provide power conversion by controlling switching transistor 107, and thereby the primary current $I_P$ through the flyback transformer (primary winding 112). Power from the AC line is converted through regulated operation of the flyback transformer into a regulated, substantially constant secondary-side current $I_{LED}$ supplied to LED string 103.

Controller 105 receives VCC from the auxiliary winding 115. Startup VCC is provided by an external startup resistor $R_{SU}$, pulling up the VCC pin until the controller initiates gate drive to the switching transistor, transitioning from open (startup) to closed loop operation under the primary side regulation loop, with VCC supplied from the auxiliary winding.

Figure 1B:
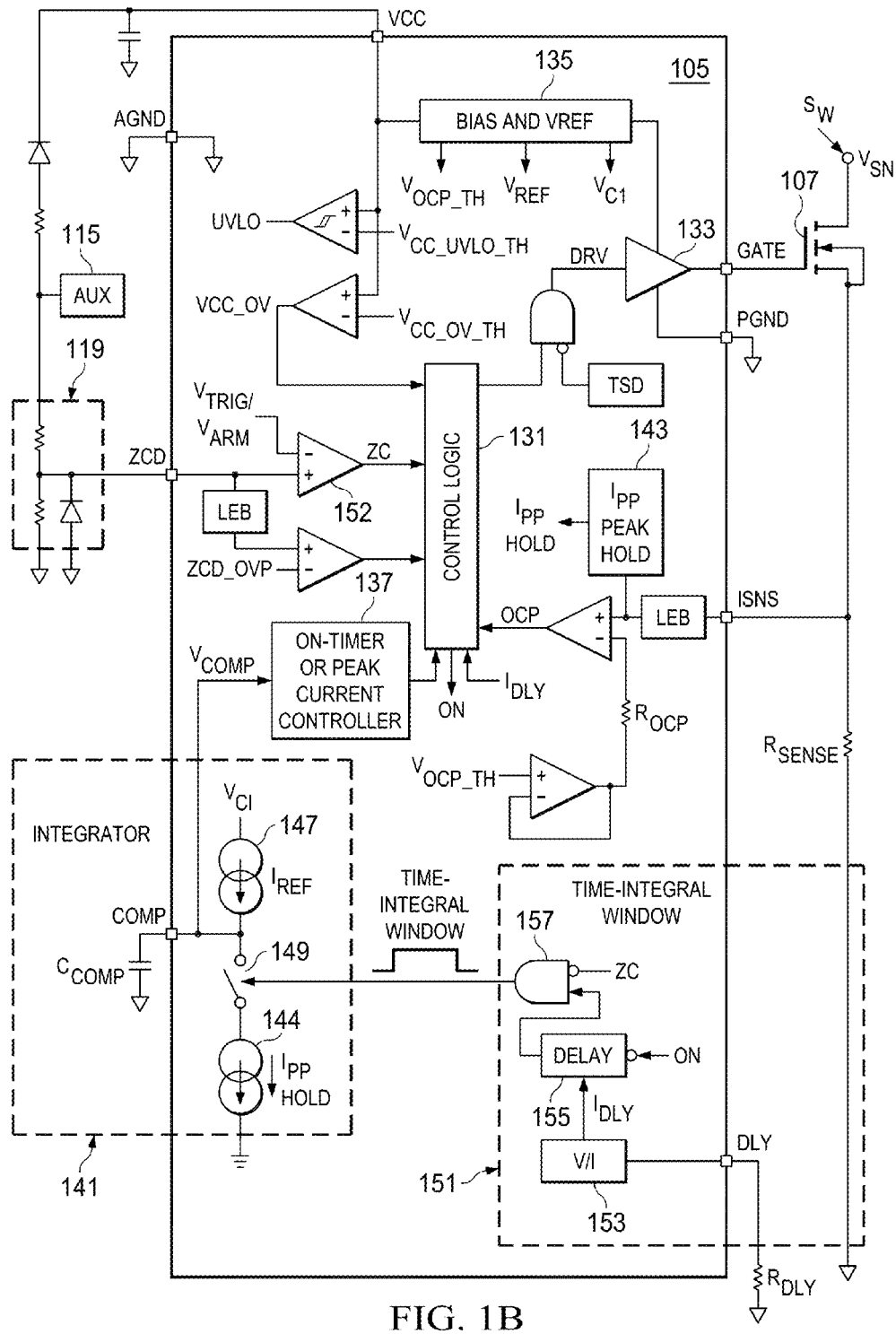
FIG. 1B illustrates an example embodiment of a primary side controller configured for primary side regulation according to aspects of the claimed invention disclosed in this Specification, such as may be used in the example embodiment of the flyback switching regulator in FIG. 1A.

Referring also to FIG. 1B, illustrating an example embodiment of the primary side controller 105, primary side regulation in accordance with the claimed invention as disclosed in this Specification is enabled by four inputs to the controller: COMP, ISNS, ZOO and DLY. Briefly:

COMP is a switching regulation input provided by an integration voltage $V_{COMP}$ stored on a compensation capacitor $C_{COMP}$. The charge on $C_{COMP}$ is regulated by controller 105 operating under the primary side regulation loop, and $V_{COMP}$ is then used to modulate the switching cycles $SW_{ON}/SW_{OFF}$ of the transistor 107.

ISNS is a switching current sense input taken from a sense resistor $R_{SENSE}$ that senses current through the switching node SW and transistor 107. In particular, ISNS is used to capture and hold the primary peak current $I_{PP}$ at the time when the switching transistor switches off at $SW_{OFF}$.

ZCD and DLY are inputs used by controller 105 to effect primary side regulation, including in one example embodiment, valley switching, in accordance with aspects of the claimed invention disclosed in this Specification.

ZCD is a zero crossing detect input taken from primary-side auxiliary winding 115 (through a voltage divider/clamp network 119), sensing the switching node voltage $V_{SW}$ (transistor drain voltage) at the primary side switching node SW to detect a primary side zero crossing ZCD associated with $V_{SW}$ resonating down to Vin after the secondary current $I_S$ in the secondary winding decreases to zero.

DLY is a time delay input associated with the quasi-resonant damping of the primary side switching node voltage $V_{SW}$ after the secondary current $I_S$ decreases to zero. For the exemplary embodiment, DLY is determined by a resistor $R_{DLY}$ which is selected/specified based on switch node resonance determined by primary side inductance and switching node capacitance.

FIG. 2A is an example waveform illustrating switched primary and secondary side currents $I_P$ and $I_S$, and FIG. 2B is an example waveform for the voltage $V_{SW}$ at the primary side switching node SW. In these Figures (and FIGS. 3A/B/C/D and 4A/B/C):

$I_P$ Primary current through the primary-side winding
$I_S$ Secondary current through the secondary-side winding
$I_{LED}$ Average, regulated current through the LED load
$L_P$ Primary-side winding inductance
$L_S$ Secondary-side winding inductance
N Transformer turns ratio
$V_{LED}$ Output LED load voltage
$V_{SW}$ Voltage at the Primary-side switching node SW In particular, FIGS. 2A and 2B illustrate the switching cycles of the switching transistor (FIG. 1A, 107) under primary side regulation according to this Specification, where $SW_{ON}$ Switching Transistor ON
$SW_{OFF}$ Switching Transistor OFF
$T_{ON}$ Time between $SW_{ON}$ and $SW_{OFF}$
$T_{OFF}$ Time between $SW_{OFF}$ and next $SW_{ON}$
$T_{OFF1}$ Time between $SW_{OFF}$ and $I_S=0$
$T_{OFF2}$ Time between $I_S=0$ and next $SW_{ON}$ A switching cycle is $T_{ON}+T_{OFF}$, where $T_{OFF}=T_{OFF1}+T_{OFF2}$. During $T_{ON}$, the primary current $I_P$ ramps up to the primary peak current $I_{PP}$ at $SW_{OFF}$—by definition, during $T_{OFF1}$ secondary current $I_S$ ramps down from secondary peak current $I_{SP}$ to $I_S=0$, and in accordance with discontinuous conduction mode, $T_{OFF2}$ is the time between $I_S=0$ at the end of $T_{OFF1}$ and the initiation of the next $T_{ON}$ (i.e., the next switching cycle initiated by $SW_{ON}$).

The primary side regulation loop modulates the switching cycles $T_{ON}/T_{OFF}$, and thereby the current through the primary side winding of the flyback transformer in order to regulate current through the secondary side winding and thereby current through the LED load. That is, regulation is in accordance with the proportionality between Ton (primary side current $I_P$) and average LED load current $I_{LED}$.

$$ILED = \frac{N*VIN}{2*LP*\left(\frac{N*VLED}{VIN} + \frac{TOFF2}{TOFF1} + 1\right)} * TON$$

Typically, $T_{OFF1} \gg T_{OFF2}$, so that $$ILED \approx \frac{N*VIN}{2*LP*\left(\frac{N*VLED}{VIN} + 1\right)} * TON$$

Thus, $I_{LED}$ is directly proportional to $T_{ON}$, and $I_{LED}$ can be regulated by modulating $T_{ON}$.

However, closed loop modulation of $T_{ON}$ requires information about secondary side current, because $I_{LED}$ is the time average of the secondary side current ramp from secondary side peak $I_{SP}$ to $I_S=0$. Secondary peak current $I_{SP}$ is related to the primary peak current $I_{PP}$ by the transformer turns ratio N: $I_{SP}=I_{PP}*N$. However, under primary side regulation, $I_S=0$ cannot be directly sensed—instead, in accordance with aspects of the claimed invention disclosed in this Specification, the primary side regulation loop uses the primary side detection of a zero crossing ZCD of $V_{SW}$ at the primary side switch node voltage SW to project for $I_S=0$.

Referring to the example embodiment in FIG. 1A, in accordance with aspects of the claimed invention as disclosed in this Specification, switching regulator 101, including the controller 105, and the flyback transformer 111 establish a primary side regulation loop to control the switching cycles $I_{ON}/T_{OFF}$ of the transistor 107, including (a) modulating $T_{ON}$ to regulate secondary side current $I_S$, and thereby $I_{LED}$ through the LED load, and, in one example embodiment, (b) controlling $T_{OFF}$ and in particular $T_{OFF2}$ to implement valley switching based on the resonant behavior of flyback transformer 111 at the primary side switch node SW.

FIGS. 2A and 2B illustrate the operation of flyback transformer in quasi-resonant, discontinuous conduction mode according to this Specification. At initiation of switching cycle $T_{ON}$, the switching transistor is switched on at $SW_{ON}$, and primary current $I_P$ (transistor drain current) ramps up to the primary peak current $I_{PP}$ at the end of $T_{ON}$ when the switching transistor is switched off at $SW_{OFF}$. Under operation of the primary side regulation loop, $SW_{OFF}$ is controlled relative to $SW_{ON}$, modulating $T_{ON}$.

Referring also to FIG. 1A, when the switching transistor 107 is switched off, the current in primary winding 112 of the flyback transformer 111 collapses, and $V_{SW}$ at the switching node SW transitions rapidly (typically in microsecond range) to $V_{IN}$ plus reflected output voltage $N*V_{LED}$ (ignoring any inductive spike $SW_{OFF}$). Secondary side current $I_S$ ramps down to zero in accordance with discontinuous conduction mode operation of the flyback transformer.

Because of the primary inductance and the node capacitance at the primary side switching node SW, flyback converter 111 is quasi resonant. That is, when the secondary current $I_S$ reaches zero, $V_{SW}$ at the primary side switching node SW does not instantaneously collapse to $V_{IN}$, but rather, rings down with quasi-resonant damping. In particular, as illustrated in FIG. 2B, $V_{SW}$ resonates down from $V_{IN}$+ $N*V_{LED}$ through VIN, designated as a zero crossing voltage ZCD, toward a voltage valley $V_{SW}$(Valley).

As noted, switch node resonance is determined by inductance of the primary winding and node capacitance, and is independent of primary side input voltage $V_{IN}$ and secondary side load current $I_{LED}$. Thus, this switch node resonance is a design parameter of switching regulator 101 and flyback transformer 111 that can be configured and determined during design—as noted, for the example embodiment in FIGS. 1A and 1B, the switching regulator selects $R_{DLY}$ based on switch node resonance.

In accordance with aspects of the claimed invention as disclosed in this Specification, the zero crossing ZCD of the primary side switching node $V_{SW}$ is representative of the secondary side winding current $I_S$, and in particular embodiments, ZCD is used in conjunction with the DLY adjustment to provide a time integral window corresponding in duration to $T_{OFF1}$. On the primary side, ZCD is detected as a zero crossing that occurs when $V_{SW}$ resonates down from $V_{IN}$+ $N*V_{LED}$ (according to switch node resonance) to cross $V_{IN}$ after the secondary current $I_S$ ramps down to zero.

FIGS. 3A and 3B illustrate the relationship between ZCD detected on the primary side and the occurrence of $I_S$=0 on the secondary side. FIG. 3A illustrates switched primary and secondary side currents $I_P$ and $I_S$, with primary and secondary peak currents $I_{PP}$ and $I_{SP}$. FIG. 3B illustrates the voltage $V_{SW}$ at the primary side switching node resonating down through the zero crossing ZCD, including illustrating transistor switching cycles $T_{ON}$ and $T_{OFF}$ (=$T_{OFF1}$+$T_{OFF2}$), and in particular the relationship between $T_{OFF2}$ and ZCD.

Specifically, during $T_{OFF2}$ (i.e., after $T_{OFF1}$ ends at $I_S$=0), VSW resonates down through ZCD according to the primary side switch node resonance (which from above is determined by primary inductance and node capacitance at the switching node SW). $T_{OFF2}$ (and therefore $T_{OFF}$) ends, and the next switch cycle $T_{ON}/T_{OFF}$ begins with $SW_{ON}$ at a quasi-resonant valley $V_{SW}$(Valley) at the of primary side switch node, implementing valley switching. For the example embodiment, as a result of the quasi-resonant decrease of $V_{SW}$, the occurrence on the primary side of ZCD is delayed after the occurrence $I_S$=0 on the secondary side by a time delay DLY corresponding to $T_{OFF2}/2$.

In accordance with aspects of the claimed invention as disclosed in this Specification, ZCD detected at the primary side switching node SW is used to define a time-integral window. This time-integral window is used to modulate the switch cycle $T_{ON}$, and thereby the secondary side current $I_{LED}$ supplied to the LED load (i.e., the average LED output current $I_{LED}$). The duration of the time-integral window is determined by ZCD (adjusted in some example embodiments by DLY), and $T_{ON}$ is modulated in accordance with the time-integral window and the relationship between primary and secondary side peak currents: ISP=$I_{PP}$*N.

FIGS. 3C and 3D illustrate example embodiments of the primary side regulation methodology disclosed in this Specification, as represented by time-integral windows used in modulating primary side switching cycles $T_{ON}/T_{OFF}$. FIG. 3C illustrates an embodiment in which primary side regulation modulates the switching cycle $T_{ON}$ based on a time-integral window corresponding to $SW_{OFF}$ (leading edge) and ZCD (trading edge). FIG. 3C illustrates an embodiment in which primary side regulation modulates the switching cycle $T_{ON}$ based on a time-integral window corresponding to a trailing edge ZCD but with a leading edge adjusted for the time delay DLY between the secondary side occurrence of $I_S$=0, and the primary side detection of ZCD (basically, $SW_{OFF}$+DLY).

FIGS. 4A, 4B and 4C illustrate an example embodiment of the primary side regulation methodology in which primary side sensing of ZCD and the determination of DLY associated switch node resonance is used both (a) for adjusting the leading edge of the time-integral window by DLY in relation to the primary side detection of ZCD, and (b) for effecting valley switching by controlling the initiation of the next switch on cycle TON at $SW_{ON}$ to be the resonant time delay DLY after the primary side detection of ZCD, as $V_{SW}$ continues to resonate down to the valley at $V_{SW}$(Valley). FIGS. 4A and 4C respectively illustrate primary and secondary side current ramps $I_P/I_{PP}$ and $I_{SP}/I_S$, and primary side switching node voltage $V_{SW}$ with valley switching at $V_{SW}$(Valley).

FIG. 4B illustrates the time-integral window in relation to FIGS. 4A and 4C. Specifically, for this example embodiment, the time-integral window is shown in relation to the period $T_{OFF}=T_{OFF1}+T_{OFF2}$ between $T_{ON}$ switching cycles, and in particular the time delay DLY due to resonant damping corresponding to $T_{OFF2}/2$ before and after ZCD.

To improved modulation accuracy, the leading edge of the time integral window is adjusted for the time-delay DLY corresponding to the primary side switch node voltage V resonating down to $V_{IN}$ as detected at the primary side by ZCD. Thus, the time-integral window is set at $T_{OFF1}$, corresponding to the secondary side current $I_S$ ramping down from $I_{SP}$ to zero (the integral of the secondary side current ramp corresponding the average load current $I_{LED}$).

To effect valley switching, the next switching cycle $T_{ON}$ is not initiated until the time delay DLY after the primary side detection of ZCD (i.e., $T_{OFF2}/2$). Thus, the switching transistor does not switch on at $SW_{ON}$ to initiate the next $T_{ON}$ cycle until the primary side node voltage $V_{SW}$ decreases to a valley voltage $V_{SW}$(Valley).

FIG. 1B illustrates an example embodiment of the primary side controller 105, such as may be used in the example embodiment of a switching regulator in FIG. 1A, including configuration for primary side regulation in accordance with the claimed invention as disclosed in this Specification.

The schematic in FIG. 1B for the example embodiment of controller 105 includes a number of circuits and blocks that provide functionality commonly implemented in a switching regulator controller for LED and other applications, but which functionalities are not relevant to the disclosure provided by this Specification, for example: UVLO (under voltage lock out), OVP (over voltage protection), OCP (over current protection), TSD (thermal shutdown). The following description of the circuitry and operation of controller 105 is limited to that circuitry and operation relevant to the claimed invention disclosed in this Specification.

Controller 105 includes control logic 131 that receives various control inputs and provides switching control signals to a gate driver 133 to control the switching of transistor 107.

Bias and VREF circuitry 135 receives VCC and provides voltage references VREF and VC1. After startup (as described in connection with FIG. 1A), VCC is provided by the auxiliary winding 115 of the flyback transformer (FIG. 1A, 111).

An On-Timer/Peak Current Controller 137 is responsive to $V_{COMP}$ to generate modulation signals used by control logic 131 to control modulation of the $T_{ON}$ switching cycles in accordance with the primary side regulation methodology disclosed in this Specification. $T_{ON}$ modulation control, and the corresponding $SW_{ON}/SW_{OFF}$ switching control of switching transistor 107, may be provided by either modulating on-time $T_{ON}$, or modulating primary peak current (which indirectly controls the switch cycle $T_{ON}$).

Controller 105 operating under primary side regulation according to this Specification controls switching of transistor 107, and specifically the $T_{ON}/T_{OFF}$ switching cycles. In accordance with aspects of the claimed invention as disclosed in this Specification, primary side regulation of secondary side current is based on the primary side detection of a zero crossing ZCD corresponding to the primary side node voltage $V_{SW}$ resonating down to $V_{IN}$ after $I_S$ ramps from $I_{SP}$ to zero after $SW_{OFF}$.

For this example embodiment, primary side regulation includes determination of a resonant time delay DLY between the secondary side occurrence of $I_S=0$, and the primary side detection of ZCD. This resonant delay DLY is determined by the selection of $R_{DLY}$ based on measured primary inductance and node capacitance at the primary side switching node SW. This resonant time delay DLY is used both (a) to adjust for the leading edge of the time-integral window by DLY in relation to the primary side detection of ZCD (basically, $SW_{OFF}$+ DLY or $T_{OFF}/2$), and (b) to effect valley switching by controlling the initiation of the next switch on cycle $T_{ON}$ at $SW_{ON}$ corresponding to DLY after the primary side detection of ZCD (basically, ZCD+DLY or $T_{OFF}/2$).

Controller 105 includes two networks that control $V_{COMP}$ and therefore modulation of the switch cycle $T_{ON}$: an integrator network 141 and a time-integral window network 151.

Integrator network 141 regulates the integration voltage $V_{COMP}$ input at COMP and provided to the on-timer or peak current controller 137, and thereby controls modulation of the switching cycle $T_{ON}$. $V_{COMP}$ is controlled according to the integration of IPP Hold and the time-integral window: [$I_{PP}$Hold*T-I_W].

Integrator network 141 includes two current sources: and $I_{PP}$ Hold current source 144 and $I_{REF}$ current source 147. $I_{REF}$ is an internal reference current generated from VREF provided by the bias and VREF circuitry 135. The IPP Hold current source 144 is controlled by an $I_{PP}$ Hold current control signal corresponding to the primary peak current $I_{PP}$, captured and held each $T_{ON}$ cycle by an $I_{PP}$ Peak Hold circuit 143 based on the ISNS input (the transistor current sensed by $R_{SENSE}$).

Current sources 144 and 147 establish, respectively, discharge and charge paths for controlling the charge Q on $C_{COMP}$ and therefore $V_{COMP}$. The integration [$I_{PP}$Hold*T-I_W] is accomplished a time-integral switch 149 controlled by the time-integral window T-I_W from the time integral network 151.

If discharge Q during the time-integral window ($I_{PP}$ Hold× T-I_W) is greater than charge Q from $I_{REF}$, then $V_{COMP}$ will decrease, as a result gate output $SW_{ON}$ time will decrease at next cycle. Otherwise, if the charge Q from $I_{REF}$ is greater than the discharge Q during the time integral window ($I_{PP}$× T-I_W), $V_{COMP}$ will increase, and gate drive output ON time will increase at next cycle.

The time integral window T-I_W is generated by the time-integral window network 151 based on $SW_{OFF}$ and the zero crossing detect ZCD and, in this example embodiment, the time-delay DLY.

ZCD is provided by the primary-side auxiliary winding 115 (through a voltage divider/clamp network 119), sensing the $V_{SW}$ switching node voltage (transistor drain voltage) at the primary side switching node SW to detect a primary side zero crossing ZCD associated with $V_{SW}$ resonating down to $V_{IN}$ after the secondary current $I_S$ decreases to zero. The ZCD input is provided to a comparator 152 which generates an internal zero crossing signal ZC provided to control logic 131 and to the time integral network.

DLY is the time delay (time error) in ZCD relative to the secondary side winding current $I_S$ ramping down to zero. In the example embodiment in FIG. 1B, DLY is used to adjust the time integral window to correspond to $T_{OFF1}$ (i.e., the time duration for the secondary side current ramp from $I_{PS}$ to zero after the switching transistor is switched off at $SW_{OFF}$). As described above, for the exemplary embodiment, DLY is determined by the selection of resistor $R_{DLY}$ based on primary inductance and node capacitance at the primary side switching node SW. A reference voltage (such as a bandgap reference) from a V/I converter circuit 153 provides a DLY current $I_{DLY}$ corresponding to DLY according to V/$R_{DLY}$.

$I_{DLY}$ is a control input to a delay circuit 155, setting the delay provided by the delay circuit, introducing the time delay adjustment to the time integral window. $I_{DLY}$ is also provided to control logic 131, controlling the initiation of switching cycles ($SW_{ON}/T_{ON}$) to effect valley switching.

To adjust the time integral window, the delay circuit receives the inverted ON signal from control logic 131, corresponding to the deassertion of the ON gate drive signal at $SW_{OFF}$. This $SW_{OFF}$ signal, delayed by delay circuit 155 according to DLY/$I_{DLY}$, is input to a logic gate 157 that also receives the inverted internal zero crossing signal ZC from comparator 152.

In response, logic gate 157 outputs a time integral widow with a leading edge corresponding to $SW_{OFF}$ adjusted by DLY and a trailing edge set by ZC (corresponding to TOFF1 in FIG. 4A).

For the example embodiment, control logic 131 uses the $I_{DLY}$ control input to effect valley switching by controlling initiation of a $T_{ON}$ switching cycle with $SW_{ON}$ in accordance with the quasi-resonant operation of the flyback transformer.

Thus, for this example embodiment, controller 105 establishes a primary side regulation loop for regulating power conversion by a switching regulator and flyback transformer, supplying a regulated load current (such as to a LED string/ load) based on (a) the accurate determination of secondary side winding current based on primary side detection of ZCD and adjustment for quasi-resonant affects, and (b) quasi-resonant valley switching.

While this disclosure has described certain example embodiments and generally associated methods, and example applications, the principles and features of the invention may be implemented in or with any suitably arranged device or system, and various design choices are possible without departing from the scope of the invention as defined by the Claims. Accordingly, the above description of example embodiments and example applications does not define or constrain the scope of the invention, which shall be defined by the following Claims.

The invention claimed is:

1. A circuit for controlling a switching regulator including a flyback transformer with primary and secondary windings and a switching transistor coupled to the primary side winding at a switching node SW, and configured to supply regulated current to a load that is isolated from a source of input power by the flyback transformer, the circuit comprising:
controller circuitry configured to switch the transistor on at a time $SW_{ON}$ and off at a time $SW_{OFF}$, such that a primary current $I_P$ through the primary side winding increases from substantially zero at $SW_{ON}$ to a primary peak current $I_{PP}$ at $SW_{OFF}$, thereby inducing in the secondary side winding a secondary current $I_S$ that decreases from a peak current $I_{SP}$ at $SW_{OFF}$ to substantially zero before the transistor is switched on at a next $SW_{ON}$, in accordance with discontinuous conduction mode operation;

a zero crossing detect circuit configured to detect, after $SW_{OFF}$, a zero crossing ZCD corresponding to a voltage $V_{SW}$ at the primary side switching node SW decreasing in magnitude to an input voltage $V_{IN}$, which occurs after the secondary current $I_S$ is substantially zero and before the transistor is switched on at the next $SW_{ON}$; and time-integral circuitry configured to establish a time-integral window T-I_W with a leading edge corresponding to $SW_{OFF}$ and a trailing edge corresponding to ZCD;

the controller circuitry operable to modulate at least the time $SW_{OFF}$ relative to $SW_{ON}$ based on the primary peak current IPP at $SW_{OFF}$ and the time-integral window T-I_W, such that a regulated load current is supplied to the load.

2. The circuit of claim 1:

wherein the flyback transformer is characterized by quasi-resonance associated with the transformer inductance and node capacitance at the primary-side switching node SW, such that $V_{SW}$ decreases by quasi-resonant damping through the zero crossing ZCD to at least a first valley voltage $V_{SW}$(Valley);

wherein the time-integral circuitry includes delay circuitry configured to determine, after the time $SW_{OFF}$, a time delay DLY corresponding to the time for $V_{SW}$ to decrease by resonant damping from a voltage associated $SW_{OFF}$ to ZCD, and wherein the time delay DLY is used by at least one of: (a) the time-integral circuitry to adjust the leading edge of the time-integral window T-I_W by DLY such that T-I_W corresponds to a duration $T_{OFF1}$ between $SW_{OFF}$ and the time $I_S$ decreases to substantially zero, and (b) the controller circuitry to initiate $SW_{ON}$ at a time corresponding to DLY after the occurrence of ZCD, corresponding to a duration $T_{OFF2}$ between the time $I_S$ decreases to substantially zero and the time $V_{SW}$ decreases to $V_{SW}$(Valley).

3. The circuit of claim 2, wherein the delay circuit comprises a predetermined voltage source and a predetermined resistance cooperatively configured to generated a current $I_{DLY}$ corresponding to DLY.

4. The circuit of claim 1, wherein the controller circuitry is operable to modulate at least one of: (a) the primary peak current by modulating the time $SW_{OFF}$ relative to $SW_{ON}$, and (b) Ton by modulating the time $SW_{OFF}$ relative to $SW_{ON}$.

5. The circuit of claim 1, wherein the load comprises at least one LED.

6. The circuit of claim 1, further comprising:

IPP hold circuitry configured to provide an $I_{PP}$ Hold signal corresponding to the primary peak current IPP at $SW_{OFF}$;

integrator circuitry responsive to the IPP Hold signal and the time-integral window T-I_W to integrate onto a compensation capacitor a modulation voltage $V_{COMP}$ according to [IPP Hold*T-I_W]

the controller circuitry being operable to modulate the time $SW_{OFF}$ relative to $SW_{ON}$ based on Vcomp, such that a regulated load current is supplied to the load.

7. A method of supplying regulated current to a load that is isolated from a source of input power by a flyback transformer with primary and secondary side windings and a switching transistor coupled to the primary side winding at a primary side switching node SW, comprising:

controlling the transistor to switch on at a time $SW_{ON}$ and off at a time $SW_{OFF}$, such that a primary current $I_P$ through the primary side winding increases from substantially zero at $SW_{ON}$ to a primary peak current $I_{PP}$ at $SW_{OFF}$, thereby inducing in the secondary side winding a secondary current $I_S$ that decreases from a peak current $I_{SP}$ at $SW_{OFF}$ to substantially zero before the transistor is switched on at a next $SW_{ON}$, in accordance with discontinuous conduction mode operation;

detecting, after $SW_{OFF}$, a zero crossing ZCD corresponding to a voltage $V_{SW}$ at the primary side switching node SW decreasing in magnitude to an input voltage $V_{IN}$, which occurs after the secondary current $I_S$ is substantially zero and before the transistor is switched on at the next $SW_{ON}$;

establishing a time-integral window T-I_W with a leading edge corresponding to SWOFF and a trailing edge corresponding to ZCD; and modulating at least the time $SW_{OFF}$ relative to $SW_{ON}$ based on the primary peak current $I_{PP}$ at $SW_{OFF}$ and the time-integral window T-I_W, such that a regulated load current $I_{LD}$ is supplied to the load.

8. The method of claim 7, wherein the flyback transformer is characterized by quasi-resonance associated with the transformer inductance and node capacitance at the primary-side switching node SW, such that $V_{SW}$ decreases by quasi-resonant damping through a zero crossing ZCD to at least a first valley voltage $V_{SW}$(Valley), further comprising determining, after the time $SW_{OFF}$, a time delay DLY corresponding to a time for $V_{SW}$ to decrease by resonant damping from a voltage associated $SW_{OFF}$ to ZCD, and using the time delay DLY for at least one of: (a) adjusting the leading edge of the time-integral window T-I_W by DLY such that T-I_W corresponds to a duration $T_{OFF1}$ between $SW_{OFF}$ and the time $I_S$ decreases to substantially zero, and (b) initiating $SW_{ON}$ at a time corresponding to DLY after the occurrence of ZCD, corresponding to a duration $T_{OFF2}$ between the time $I_S$ decreases to substantially zero and the time $V_{SW}$ decreases to $V_{SW}$ (Valley).

9. The method of claim 7, wherein modulating at least the time $SW_{OFF}$ relative to $SW_{ON}$ is accomplished by at least one of: (a) the primary peak current by modulating the time $SW_{OFF}$ relative to $SW_{ON}$, and (b) Ton by modulating the time $SW_{OFF}$ relative to $SW_{ON}$.

* * * * *